United States Patent
Jiang et al.

(10) Patent No.: US 11,667,806 B2
(45) Date of Patent: Jun. 6, 2023

(54) LOW VOC AND HIGH SOLID FLUOROPOLYMER FOR COATING APPLICATIONS

(71) Applicant: HONEYWELL INTERNATIONAL INC., Charlotte, NC (US)

(72) Inventors: Wanchao Jiang, Shanghai (CN); Rajiv Ratna Singh, Morris Plains, NJ (US); Gang Xu, Shanghai (CN); Siyuan Zhang, Shanghai (CN); Yun Lin, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/467,320

(22) Filed: Sep. 6, 2021

(65) Prior Publication Data
US 2022/0041884 A1 Feb. 10, 2022

Related U.S. Application Data

(62) Division of application No. 15/506,979, filed as application No. PCT/US2015/049250 on Sep. 9, 2015, now Pat. No. 11,111,405.

(60) Provisional application No. 62/047,959, filed on Sep. 9, 2014.

(51) Int. Cl.
C09D 127/12 (2006.01)
G06Q 40/12 (2023.01)
B05D 3/00 (2006.01)

(52) U.S. Cl.
CPC ......... C09D 127/12 (2013.01); B05D 3/007 (2013.01); G06Q 40/123 (2013.12)

(58) Field of Classification Search
CPC ..... C09D 127/12; G06Q 40/123; B05D 3/007
See application file for complete search history.

Primary Examiner — Robert S Walters, Jr.
(74) Attorney, Agent, or Firm — Roberts & Roberts, LLP; Richard S. Roberts, Jr.

(57) ABSTRACT

Methods of reducing the release of volatile organic compounds (VOCs) into the Earth's atmosphere during coating operations are provided, as well as a coating composition comprising a carrier and one or more fluorocopolymers. The carrier comprises VOC compounds and the one or more fluorocopolymers is produced by copolymerization of (1) a first monomer selected from the group consisting of hydrofluoroalkenes, (2) a second monomer comprising vinyl ester(s), and (3) a third monomer comprising vinyl ether(s), wherein at least a portion of the vinyl ether monomer is a hydroxyl group-containing vinyl ether, and wherein the one or more fluorocopolymers comprise at least about 70% by weight of the coating composition and the VOC portion of the carrier is not greater than about 30% by weight of the coating composition.

7 Claims, No Drawings

LOW VOC AND HIGH SOLID FLUOROPOLYMER FOR COATING APPLICATIONS

CROSS-REFERENCE TO RELATED APPLICATIONS

This application is a Divisional of U.S. application Ser. No. 15/506,979 filed Feb. 27, 2017, now U.S. Pat. No. 11,111,405, which granted on Sep. 7, 2021, which is a U.S. National Phase entry of International Application No. PCT/US2015/049250 filed on Sep. 9, 2015, which claims priority from U.S. Provisional Application Ser. No. 62/047,959 filed Sep. 9, 2014, the disclosures of which are incorporated herein by reference.

FIELD OF THE INVENTION

The present invention relates to methods of reducing the exposure of Earth's atmosphere to volatile organic compounds (VOCs) while forming protective coatings on substrates, and to coating compositions used in such methods.

BACKGROUND OF THE INVENTION

Volatile organic compounds (VOCs) are volatile compounds of carbon that are subject to regulation by various government authorities, and for the purposes of the present invention the term is used consistent with proposed regulations established by the United States Environmental Protection Agency (EPA). More specifically, these proposed regulations establish that a compound of carbon is a VOC if it has a vapor pressure of less than about 0.1 millimeters of mercury at 20° C.

A variety of chemicals are within the definition of VOC, and some of these chemicals have short- and long-term adverse health effects when released into the atmosphere. Accordingly, many countries have regulations governing the release of such compounds into the Earth's atmosphere. One relatively large source of release of such compounds into the environment has been from the solvents that are used in coating products such as, paints, varnishes, waxes, adhesives, inks and the like. Many cleaning, disinfecting, cosmetic, degreasing, and hobby products also contain VOCs as solvents or carriers. One method to reduce or eliminate the release of such compounds into the atmosphere is to capture and prevent release of the solvent as it evaporates from the coating composition. Such methods can involve, for example, the installation of a mechanism to capture the vapors and to process such vapors in an incinerator. However, as will be appreciated to those skilled in the art a substantial capital cost and/or processing cost is incurred as a result of such operations, and such operations can sometimes add detrimentally to the time required to complete such coating operations.

In order to reduce and control the VOC emission into the Earth's atmosphere, more and more countries have started to regulate VOC emissions. Such regulations include in various countries charging a VOC tax upon release of such compounds. Accordingly, there are many incentives to reduce the release of VOCs into the atmosphere.

SUMMARY OF THE INVENTION

One aspect of the present invention provides methods of reducing the release of volatile organic compounds (VOCs) into the Earth's atmosphere during coating operations of the type that permit the escape of VOCs into the Earth's atmosphere. In preferred embodiments the methods according to this aspect include the steps of:

(a) providing a substrate to be coated;
(b) providing a coating composition which is formed by steps comprising:
   (i) providing one or more fluorocopolymers by copolymerization of (1) one or more hydrofluoroolefin monomer(s) selected from the group consisting of hydrofluoroethylenes, hydrofluoropropenes, hydrofluorobutenes, hydrofluoropentenes and combinations of these, and preferably selected from 2,3,3,3-tetrafluoropropene, 1,3,3,3-tetrafluoropropene and combinations of these, (2) one or more vinyl ester monomer(s), and (3) one or more vinyl ether monomer(s), wherein at least a portion of said vinyl ether monomer is a hydroxyl group-containing vinyl ether monomer, wherein the copolymer preferably has a number average molecular weight of greater than about 10,000 and preferably a weight average molecular weight of greater than about 20,000, as measured according the procedure as described herein; and
   (ii) providing a carrier for said one or more fluorocopolymers, said carrier comprising one or more VOC compounds; and
   (iii) combining said one or more fluorocopolymers with said carrier to produce a polymeric composition comprising not greater than about 30% by weight of said carrier, preferably with a solids content of at least about 70% by weight;
(c) coating the substrate with said coating composition provided by steps that comprise said providing step (b); and
(d) forming a protective polymeric layer on said substrate by allowing at least a substantial portion of said VOCs in said carrier to evaporate into the Earth's atmosphere, whereby said protective coating is formed.

Another aspect of the present invention provides methods for obtaining a VOC tax credit as a result of reducing the release of volatile organic compounds (VOCs) into the Earth's atmosphere compared to a baseline coating operation of the type that permits the escape of VOCs into the Earth's atmosphere. In preferred embodiments, methods according to this aspect includes the steps of:

(a) establishing a baseline release of VOCs from an existing operation which involves coating of a substrate with an existing coating composition;
(b) providing a reduced VOC coating composition formed by steps comprising:
   (i) providing one or more fluoropolymers by copolymerization of (1) one or more hydrofluoroolefin monomer(s) selected from the group consisting of hydrofluoroethylenes, hydrofluoropropenes, hydrofluorobutenes, hydrofluoropentenes and combinations of these, and preferably selected from 2,3,3,3-tetrafluoropropene, 1,3,3,3-tetrafluoropropene and combinations of these,
   (2) one or more vinyl ester monomer(s), and (3) one or more vinyl ether monomer(s), wherein at least a portion of said vinyl ether monomer is preferably a hydroxyl group-containing vinyl ether monomer; and
   (ii) providing a carrier for said one or more fluoropolymers, said carrier comprising one or more VOC compounds; and
   (iii) combining said one or more fluoropolymers with said carrier to produce a polymeric composition comprising not greater than about 30% by weight of said carrier, preferably with a solids content of at least about 70% by weight;

(c) coating the substrate with said reduced VOC coating composition; and (d) forming a protective polymeric layer on said substrate by allowing at least a substantial portion of said VOCs in said carrier to evaporate into the Earth's atmosphere, whereby said protective coating is formed and whereby the VOCs released using said reduced VOC coating compositions is reduced compared to said baseline release of VOC; and (e) submitting to an appropriate governmental agency a claim for tax credit based at least in part on said reduction in VOCs released from said coating operation.

According to certain preferred embodiments, the fluorocopolymer coating composition formed by step (b) of this invention has a solid content of from about 70% to about 90% by weight, and even more preferably in certain embodiments from about 75% to about 85% by weight.

According to preferred embodiments, the fluorocopolymer coating composition formed by step (b) of this invention has a VOC content of less than about 450 g/l, more preferably less than about 400 g/l, and even more preferably less than about 350 g/l.

According to preferred embodiments, the fluorocopolymer coating composition formed by step (b) of this invention has a VOC content of from about 450 g/l to about 100 g/l, more preferably from about 400 g/l to about 200 g/l, and even more preferably from about 350 g/l to about 250 g/l.

As used herein, the term hydrofluoroolefins includes but is not necessarily limited to hydrofluoroethylene, hydrofluoropropene, hydrofluorobutene and hydrofluoropentene, and the like. According to certain preferred embodiments, the hydrofluoroolefin used to form the coating composition of step (b) comprises 1,3,3,3-tetrafluoroolefin (HFO-1234ze) and/or 2,3,3,3-tetrafluoroolefin (HFO-1234yf).

In preferred embodiments, the fluoropolymer of step (b) is formed by solution copolymerization of the monomers represented by (1), (2) and (3) of step (b)(i). In preferred embodiments, step (b)(i) comprises solution copolymerizing:

(1) from about 40 mol % to about 60 mol %, and even more preferably from about 45 mol % to about 55 mol %, and even more preferably about 50 mol % of hydrofluoroolefin monomer(s), preferably selected from the group consisting of hydrofluoroethylenes, hydrofluoropropenes, hydrofluorobutenes and hydrofluoropentenes, more preferably from the group consisting of HFO-1234ze, HFO-1234yf and combinations of these, and even more preferably HFO-1234ze;

(2) from about 5 mol % to 45 mol % of vinyl ester or vinyl ether or both of them, more preferably from about 10 mol % to about 40 mol %, and even more preferably from about 20 mol % to about 40 mol %, represented by formula $CH_2=CR^1-O(C=O)_xR^2$ and $CH_2=CR^3-OR^4$ respectively, wherein x is 1 and wherein $R^1$ and $R^3$ are independently either hydrogen or a methyl group, preferably hydrogen, and wherein $R^2$ and $R^4$ are independently selected from the group consisting of an unsubstituted straight-chain, branched-chain or alicyclic alkyl group having 1 to 12 carbon atoms, preferably from 2 to 8 carbon atoms; and (3) from about 3 mol % to about 30 mol % of hydroxyalkyl vinyl ether, more preferably from about 3 mol % to about 20 mol %, and even more preferably from about 3 mol % to about 10 mol % represented by formula $CH_2=CR^3-O-R^5-OH$, where $R^3$ is as defined above, preferably hydrogen, and $R^5$ is selected from the group consisting of an C2 to C12 unsubstituted straight-chain, branched-chain or alicyclic alkyl group, more preferably an unsubstituted straight chain alkyl group having from 3 to 5 carbons, preferably 4 carbons, wherein the mol % are based on the total of the monomers in the copolymer formation step.

According to preferred embodiments, the fluorocopolymer coating composition formed by step (b) of this invention has a VOC content of from about 450 g/l to about 100 g/l, more preferably from about 400 g/l to about 200 g/l, and even more preferably from about 350 g/l to about 250 g/l.

As used herein, the term hydrofluoroolefins includes but is not necessarily limited to hydrofluoroethylene, hydrofluoropropene, hydrofluorobutene and hydrofluoropentene, and the like. According to certain preferred embodiments, the hydrofluoroolefin used to form the coating composition of step (b) comprises 1,3,3,3-tetrafluoroolefin (HFO-1234ze) and/or 2,3,3,3-tetrafluoroolefin (HFO-1234yf).

In preferred embodiments, the fluorocopolymer of step (b) is formed by copolymerization, and preferably solution copolymerization, of the monomers represented by (1), (2) and (3) as follows:

(1) from about 40 mol % to about 60 mol %, and even more preferably from about 45 mol % to about 55 mol %, and even more preferably about 50 mol % of hydrofluoroolefin monomers, preferably selected from the group consisting of hydrofluoroethylenes, hydrofluoropropenes, hydrofluorobutenes and hydrofluoropentenes, preferably from the group consisting of HFO-1234ze, HFO-1234yf and combinations of these, and even more preferably HFO-1234ze;

(2A) from about 10 mol % to about 40 mol % of vinyl ester, more preferably from about 10 mol % to about 30 mol %, and even more preferably from about 10 mol % to about 20 mol %, represented by formula $CH_2=CR^1-O(C=O)_x R^2$, wherein x is 1 and wherein $R^1$ is either hydrogen or a methyl group, and wherein $R^2$ is selected from the group consisting of an unsubstituted straight-chain, branched-chain or alicyclic alkyl group having 1 to 12 carbon atoms;

(2B) from about 10 mol % to about 40 mol % of vinyl ether, more preferably from about 10 mol % to about 30 mol %, and even more preferably from about 10 mol % to about 20 mol %, represented by formula $CH_2=CR^3-OR^4$ respectively, wherein $R^3$ is independently either hydrogen or a methyl group and wherein $R^4$ are independently selected from the group consisting of an unsubstituted straight-chain, branched-chain or alicyclic alkyl group having 1 to 12 carbon atoms; and (3) from about 3 mol % to about 30 mol % of hydroxyalkyl vinyl ether, more preferably from about 3 mol % to about 20 mol %, and even more preferably from about 3 mol % to about 10 mol % represented by formula $CH_2=CR^3-O-R^5-OH$, where $R^3$ is as defined above, preferably hydrogen, and $R^5$ is selected from the group consisting of an C2 to C12 unsubstituted straight-chain, branched-chain or alicyclic alkyl group, wherein the mol % are based on the total of the monomers in the copolymer formation step.

In preferred embodiments, the fluoropolymer coating composition formed by step (b) of the present invention has a solids content of from about 70% to about 90% by weight, more preferably in certain embodiments of from about 75% to about 85% by weight, and at the same time has a VOC content of from about 450 g/l to about 100 g/l, more preferably from about 400 g/l to about 200 g/l, and even more preferably from about 300 g/l to about 200 g/l.

According to a preferred embodiment of the present invention, the copolymer formation step (b)(i) comprises providing one or more fluorocopolymers by copolymerization of:
(1) first monomer(s) consisting essentially of HFO-1234ze and/or HFO-1234yf, preferably in an amount of from about 40 mol % to about 60 mol %, and more preferably from about 45 mol % to about 55 mol %,
(2) second monomer(s) comprising:
  A) vinyl ester monomer(s), preferably in an amount of from about 5 mol % to about 45 mol %, more preferably more preferably from about 10 mol % to about 30 mol %, and even more preferably from about 10 mol % to about 20 mol %, represented by formula $CH_2=CR^1-O(C=O)_xR^2$, wherein x is 1 and wherein $R^1$ is either hydrogen or a methyl group, and wherein $R^2$ is selected from the group consisting of a substituted or unsubstituted straight-chain or branched-chain alkyl group having 5 to 12 carbon atoms, wherein said alkyl group includes at least one tertiary or quaternary carbon atom, and
  B) vinyl ether monomer(s), preferably in amounts of from about 10 mol % to about 40 mol % of vinyl ether, more preferably from about 5 mol % to about 45 mol %, more preferably form about 10 mol % to about 30 mol %, and even more preferably from about 10 mol % to about 20 mol %, represented by formula $CH_2=CR^3-OR^4$ respectively, wherein $R^3$ is independently either hydrogen or a methyl group and wherein $R^4$ are independently selected from the group consisting of a substituted or unsubstituted straight-chain or branched-chain alkyl group having 1 to 5 carbon atoms; and
(3) third monomer(s) selected from hydroxyl group-containing vinyl ether monomer(s), preferably in an amount of from about 3 mol % to about 60 mol % of hydroxy vinyl ether monomer, preferably in an amount of from about 3 mol % to about 30 mol %, more preferably from about 3 mol % to about 20 mol %, and even more preferably from about 3 mol % to about 10 mol %, represented by formula $CH_2=C-R^5-OH$, where $R^5$ is selected from the group consisting of an C2 to C6 substituted or unsubstituted straight-chain or branched-chain alkyl group, wherein the mol % are based on the total of the monomers in the copolymer formation step.

As used herein, unless otherwise specifically indicated, reference to mol % is to the mol % of monomers used in the formation of the fluorocopolymer of the present invention, based on the total of the monomers.

In certain embodiments of the process, the copolymer formed by step (b) of the present invention has a number average molecular weight as measured by gel phase chromatography ("GPC") according to the method described in Skoog, D. A. Principles of Instrumental Analysis, 6th ed.; Thompson Brooks/Cole: Belmont, Calif., 2006, Chapter 28, which is incorporated herein by reference, of from about 5000 and 50000, more preferably from about 7000 to about 15000 and a weight average molecular weight preferably from about 5000 to about 30,000, and more preferably from about 20,000 to about 30,000.

In certain embodiments, the coating composition formed by step (b) has a VOC content of less than about 450 g/l, more preferably less than about 400 g/l, and even more preferably less than about 300 g/l.

As used herein, the term "substrate" refers to any device or article, or part of a device or article, to be coated.

As used herein, the term "carrier" is intended to refer to a component of a composition that serves to solvate, disperse and/or emulsify a monomeric or polymeric component of a composition.

DETAILED DESCRIPTION OF THE INVENTION

As described above, preferred aspects of the present invention involve coating methods that provide reduced VOC emissions while at the same time providing effective and efficient protective coatings on substrates. As those skilled in the art will appreciate, the quality of a protective coating applied to a substrate can be measured by a variety of coating properties that, depending on the particular application, are important for achieving a commercially successful coating on a given substrate. These properties include but are not limited to: (1) viscosity and (2) color retention. According to certain preferred embodiments, the coating compositions formed according to the present methods exhibit: (1) a solid concentration of at least about 70% by weight; (2) a viscosity, as measured by the ASTM Standard Test Method for Measuring Solution Viscosity of Polymers with Differential Viscometer, Designation D5225-14, of not greater than about 1700 at 25° C. and a color change after about 1000 hours, of not greater than 2.0, more preferably not greater than about 1.5, and even more preferably not greater than about 1.2, as measured in comparison to the initial color, each as measured by ASTM D 7251, QUV-A; and a VOC content of not greater than about 450 g/l, more preferably not greater than about 400 g/l, and even more preferably not greater than about 350 g/l. As mentioned above, the ability to achieve such a method resides, in part, on the judicious selection of the type and the amounts of the various components that are used to form the fluoropolymer and the coating compositions of the present invention.

Monomers

Hydrofluoroolefins

The hydrofluoroolefin monomers according to the methods of the present invention can include in certain preferred embodiments hydrofluoroethylene monomer, that is, compounds having the formula $CX^1X^2=CX^3X^4$; wherein $X^1$, $X^2$, $X^3$, $X^4$ are each independently selected from H or F or Cl atom, but at least one of them is a hydrogen atom. Examples of hydrofluoroethylene monomers include, among others:

$CH_2=CHF$,
$CHF=CHF$,
$CH_2=CF_2$, and
$CHF=CF_2$.

The hydrofluoroolefin monomers according to certain preferred aspects of the methods of the present invention include, and preferably consists essentially of or consist of hydrofluoropropene having the formula $CX^5X^6=CX^7CX^8X^9X^{10}$; wherein $X^5$, $X^6$, $X^7$, $X^8$, $X^9$ and $X^{10}$ are independently selected from H or F or Cl atom, but at least one of them is a hydrogen atom. Examples of hydrofluoro-propene monomers include, among others:

$CH_2=CFCF_3$ (HFO-1234yf),
$CHF=CHCF_3$ (HFO-1234ze),
$CHCl=CFCF_3$ and
$CH_2=CHCF_3$.

In preferred embodiments, the hydrofluroolefin comprises, consists essentially of or consist of HFO-1234yf and/or HFO-1234ze. In preferred embodiments, the hydrofluoroolefin comprises, consists essentially of or consist of HFO-1234ze.

The hydrofluoroolefin monomers according to certain preferred aspects of the methods of the present invention include, hydrofluorobutene according to the following formula: $CX^{11}X^{12}=CX^{13}CX^{14}X^{15}CX^{16}X^{17}X^{18}$; wherein $X^{11}$, $X^{12}$, $X^{13}$, $X^{14}$, $X^{15}$, $X^{16}$, $x^{17}$ and $X^{18}$ are independently selected from H or F or Cl atom, but at least one of them is a hydrogen atom. Examples of hydrofluorobutene include, among others, $CF_3CH=CHCF_3$.

Vinyl Esters

The copolymers in accordance with the present invention preferably are also formed from vinyl ester monomer units, preferably in amounts of from about 5 mol % to about 45 mol %, more preferably more preferably from about 10 mol % to about 30 mol %, and even more preferably from about 10 mol % to about 20 mol %. In preferred embodiments the vinyl ester monomer(s) are represented by the formula $CH_2=CR^1-O(C=O)_xR^2$, wherein x is 1 and wherein $R^1$ is either hydrogen or a methyl group, and wherein $R^2$ is selected from the group consisting of a substituted or unsubstituted, preferably unsubstituted, straight-chain or branched-chain, preferably branched chain, alkyl group having 5 to 12 carbon atoms, more preferably having from 5 to 10 carbon atoms, and even more preferably 8 to 10 carbon atoms. In preferred embodiments the alkyl group includes at least one tertiary or quaternary carbon atom. In highly preferred embodiments, the vinyl ester is compound which includes at least one quaternary carbon according to the following formula:

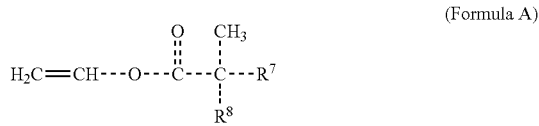

(Formula A)

where each of $R^7$ and $R^8$ are alkyl groups, preferably branched alkyl groups, that together contain from 5 to about 8, more preferably from 6 to 7, carbon atoms.

Examples of vinyl ester monomers that are preferred according to certain preferred embodiments include vinyl acetate, vinyl propionate, vinyl butyrate, vinyl pivalate, vinyl capronate, vinyl laurate, VEOVA-9 (vinyl versatate ester formed from a C9 carboxylic acid, produced by Momentive), VEOVA-10 (vinyl versatate ester formed from a C10 carboxylic acid, produced by Momentive) and vinyl cyclohexanecarboxylate. Each of VEOVA-9 and VEOVA-10 contain at least one quaternary carbon according to Formula A above. According to preferred embodiments the vinyl ester comprises vinyl versatate ester having from 11 to 12 carbon atoms in the molecule, preferably with at least one quaternary carbon according to Formula A above.

Vinyl Ethers

The copolymers in accordance with the present invention preferably are also formed from vinyl ether monomer units, preferably in amounts of from about 5 mol % to about 45 mol %, more preferably more preferably from about 10 mol % to about 30 mol %, and even more preferably from about 10 mol % to about 20 mol %. In preferred embodiments the vinyl ester monomer(s) are represented by the formula $CH_2=CR^3-OR^4$, wherein $R^3$ is independently either hydrogen or a methyl group and wherein $R^4$ is selected from the group consisting of a substituted or unsubstituted, preferably unsubstituted, straight-chain or branched-chain, preferably straight chain, alkyl group having 1 to 5 carbon atoms, more preferably 1 to 3 carbon atoms. Examples of vinyl ether monomers that are preferred according to certain preferred embodiments include alkyl vinyl ethers such as methyl vinyl ether, ethyl, propyl vinyl ether, n-butyl vinyl ether, isobutyl vinyl ether, hexyl vinyl ether, octyl vinyl ether, decyl vinyl ether and lauryl vinyl ether. Vinyl ethers including an alicyclic group can also be used, for example, cyclobutyl vinyl ether, cyclopentyl vinyl ether and cyclohexyl vinyl ether. According to preferred embodiments the vinyl ether comprises, consists essentially of, or consists of ethyl vinyl ether.

Preferably in those embodiments in which vinyl ether and vinyl ester monomers are both present, the amount of vinyl ether and vinyl ester monomers together comprise from about 25 mol % to about 45 mol % of the total monomers.

Hydroxy Vinyl Ethers

The copolymers in accordance with the present invention preferably are also formed from hydroxyl vinyl ether monomer units, preferably in amounts of from about 3 mol % to about 60 mol % of hydroxy vinyl ether monomer, preferably in an amount of from about 3 mol % to about 30 mol %, more preferably from about 3 mol % to about 20 mol %, and even more preferably from about 3 mol % to about 10 mol %. In preferred embodiments the hydroxyl vinyl ether monomer(s) are represented by the formula represented by formula $CH_2=CR^3-O-R^5-OH$, where $R^3$ is as defined above, preferably hydrogen, and where $R^5$ is selected from the group consisting of an C2 to C6 substituted or unsubstituted, preferably unsubstituted, straight-chain or branched-chain, preferably straight chain, alkyl group. Examples of preferred hydroxyalkyl vinyl ether monomers include hydroxyl-ethyl vinyl ether, hydroxypropyl vinyl ether, hydroxybutyl vinyl ether, hydroxypentyl vinyl ether and hydroxyhexyl vinyl ether. In certain embodiments, the copolymer is formed from about 5 mol % to about 20 mol % of hydroxyalkyl vinyl ether monomers, based on the total weight of the monomer.

In preferred embodiments, the comonomers according to the fluorocopolymer formation step (b)(i) comprise, and preferably consist essentially of:

(1) first monomer consisting essentially of HFO-1234ze, preferably in an amount of from about 40 mol % to about 60 mol %, and even more preferably from about 45 mol % to about 55 mol %, and even more preferably about 50 mol %, (2) second monomer(s) comprising:
  A) vinyl ester monomer represented by formula $CH_2=CR^1-O(C=O)_xR^2$ wherein x is 1 and wherein $R^1$ is either hydrogen or a methyl group, preferably hydrogen, and wherein $R^2$ is an unsubstituted branched-chain alkyl group having 6 to 8 carbon atoms, wherein said alkyl group preferably includes at least one tertiary or quaternary carbon atom, wherein said vinyl ester monomer is present in an amount of from about 5 mol % to about 45 mol %, more preferably more preferably from about 10 mol % to about 30 mol %, and even more preferably from about 10 mol % to about 20 mol %; and
  B) vinyl ether monomer(s), represented by formula $CH_2=CR^3-OR^4$ respectively, wherein $R^3$ is independently either hydrogen or a methyl group, preferably hydrogen, and wherein $R^4$ is selected from the group consisting of a substituted or unsubstituted straight-chain or branched-chain, preferably straight chain, alkyl group having 1 to 3 carbon atoms, preferably 2 carbon atoms, said vinyl ether monomer(s) preferably being present in amounts of from about 10 mol % to about 40 mol %, more preferably from about 5 mol % to about 45 mol %, more preferably form about 10 mol % to about 30 mol %, and even more preferably from about 10 mol % to about 20 mol %; and (3) third monomer(s) consisting of hydroxyalkyl vinyl ether represented by formula $CH_2=CR^3—O—R^5—OH$, where $R^3$ is methyl or hydrogen, preferably hydrogen, and $R^5$ is selected from the group consisting of an C3 to C5, preferably C4, unsubstituted straight-chain alkyl group, wherein the amount of said third monomer is preferably present in an amount of from about 3 mol % to about 30 mol %.

CoPolymer Formation Methods

It will be appreciated by those skilled in the art, based on the teachings contained herein, that copolymers of the present invention may be formed to achieve the preferred characteristics described herein using a variety of techniques, and all such techniques are within the broad scope of the present invention.

In preferred embodiments, the fluorocopolymer is preferably produced in a polymerization system that utilizes a carrier for the monomer/polymer during and/or after formation. According to one preferred embodiment the carrier acts as a solvent and/or dispersant for the monomer and/or polymer, and such operations include dispersion, emulsion and solution polymerization. Examples of carriers in such systems, including preferably solvents for solution polymerization, include: esters, such as methyl acetate, ethyl acetate, propyl acetate and butyl acetate; ketones, such as acetone, methyl ethyl acetone and cyclohexanone; aliphatic hydrocarbons, such as hexane, cyclohexane, octane, nonane, decane, undecane, dodecane and mineral spirits; aromatic hydrocarbons, such as benzene, toluene, xylene, naphthalene, and solvent naphtha; alcohols, such as methanol, ethanol, tert-butanol, iso-propanol, ethylene glycol monoalkyl ethers; cyclic ethers, such as tetrahydrofuran, tetrahydropyran, and dioxane; fluorinated solvents, such as HCFC-225 and HCFC-141b; dimethyl sulfoxide; and the mixtures thereof.

It is contemplated that the temperature conditions used in the polymerization process of the present invention can be varied according to the particular equipment and applications involved and all such temperatures are within the scope of the present invention. Preferably, the polymerization is conducted at a temperature in a range of from about 30° C. to about 150° C., more preferably from about 40° C. to about 100° C., and even more preferably from about 50° C. to about 70° C., depending on factors such as the polymerization initiation source and type of the polymerization medium.

In certain preferred embodiments, it is preferred that the solution polymerization is conducted under conditions under which the total amount of the solvent used in the copolymerization process, based on the weight of the solvent and monomer in the solution, is from about 10 wt % to about 40 wt %, more preferably in amounts of from about 10 wt % to about 30 wt %, and more preferably in certain embodiments in an amount of form about 15% to about 25%. In certain of such embodiments, the solvent used in the solution copolymerization process comprises, preferably consists essentially of, and more preferably in certain embodiments consists of C2-C5 alkyl acetate, and even more preferably butyl acetate.

In preferred embodiments, the copolymer as formed accordance with the preferred methods described herein is prepared by copolymerizing those monomers under conditions effective to achieve a copolymer having a number average molecular weight of 5000 to 50000, or is some embodiments 5000 to 10000 as measured by gel phase chromatography ("GPC") according to the method described in Skoog, D. A. Principles of Instrumental Analysis, 6th ed.; Thompson Brooks/Cole: Belmont, Calif., 2006, Chapter 28, which is incorporated herein by reference. In certain embodiments, the copolymer has a number average molecular weight that is greater than about 10000, and even more preferably from 10,000 to about 14,000. According to certain preferred embodiments, the copolymer has a molecular weight distribution of 2 to 10, more preferably 2.5 to 8, and most preferably 3 to 6. Applicants have found that in certain embodiments the use of copolymers having a molecular weight less than 5000 produces weatherability and chemical resistance of the protective coating that is less than is desired for some applications and that when the polymers have a molecular weight of more than 50000, coating compositions having viscosities that may negatively impact the spreading or coating properties of the coating compositions and hence difficulties in the coating operations.

In preferred embodiments, the formation of fluorocopolymer coating compositions comprises, and preferably consist essentially of:

(i) providing one or more fluorocopolymers by copolymerization of:
  (1) first monomer consisting essentially of HFO-1234ze, preferably in an amount of from about 40 mol % to about 60 mol %, and even more preferably from about 45 mol % to about 55 mol %, and even more preferably about 50 mol %,
  (2) second monomer(s) comprising:
    A) vinyl ester monomer represented by formula $CH_2=CR^1—O(C=O)_xR^2$ wherein x is 1 and wherein $R^1$ is either hydrogen or a methyl group, preferably hydrogen, and wherein $R^2$ is an unsubstituted branched-chain alkyl group having 6 to 8 carbon atoms, wherein said alkyl group preferably includes at least one tertiary or quaternary carbon atom, wherein said vinyl ester monomer is present in an amount of from about 5 mol % to about 45 mol %, more preferably more preferably from about 10 mol % to about 30 mol %, and even more preferably from about 10 mol % to about 20 mol %; and
    B) vinyl ether monomer(s), represented by formula $CH_2=CR^3—OR^4$, wherein $R^3$ is either hydrogen or a methyl group, preferably hydrogen, and wherein $R^4$ is selected from the group consisting of a substituted or unsubstituted straight-chain or branched-chain, preferably straight chain, alkyl group having 1 to 3 carbon atoms, preferably 2 carbon atoms, said vinyl ether monomer(s) preferably being present in amounts of from about 10 mol % to about 40 mol %, more preferably from about 5 mol % to about 45 mol %, more preferably form about 10 mol % to about 30 mol %, and even more preferably from about 10 mol % to about 20 mol %; and
  (3) third monomer(s) consisting of hydroxyalkyl vinyl ether represented by the formula $CH_2=CR^3—O—R^5—OH$, where $R^3$ is methyl or hydrogen, preferably hydrogen, and $R^5$ is selected from the group consisting of an C3 to C5, preferably C4, unsubstituted straight-chain alkyl group, wherein the amount of said third monomer is preferably from about 3 mol % to about 30 mol %; and (ii) providing a carrier for said one or more fluorocopolymers, said carrier comprising one or more VOC compounds and preferably selected from aromatic hydrocarbons such as xylene and toluene; alcohols such as n-butanol; esters such as butyl acetate; ketones such as methyl isobutyl ketone, and glycol ethers such as ethyl cellusolve, with C2-C5 alkyl acetate being preferred, and even more preferably comprising, consisting essentially of, or consisting of butyl acetate; and (iii) combining said one or more fluorocopolymers with said carrier to produce a polymeric composition comprising not greater than about 30% by weight of said carrier, preferably with a solids content of at least about 70% by weight. According to preferred embodiments, the fluorocopolymer composition of the present invention, and in particular the fluorocopolymer formed as described in the preceding sentence, has a polymer number average molecular weight as measured by gel phase chromatography ("GPC") according to the method described in Skoog, D. A. Principles of Instrumental Analysis, 6th ed.; Thompson Brooks/Cole: Belmont, Calif., 2006, Chapter 28, which is incorporated herein by reference, of from about 5000 and 50000, more preferably from about 7000 to about 15000 and has a solids content of from about 70% to about 90% by weight, and even more preferably from about 70% to about 85% by weight, and preferably a VOC content of less than about 400 g/l, more preferably from about 400 g/l to about 100 g/l, and even more preferably from about 350 g/l to about 200 g/l. It is also preferred in such embodiments as described in the present application in general, and in this paragraph as in particular, that the coating compositions of the present invention have a viscosity at 25° C. of less than about 1900 mPa·s, more preferably less than about 1800 mPa·s and even more preferably of less than about 1700 mPa·s as measured by Ford Cup at least at one of 12 revolutions per minutes (r/m), 30 r/m and 60 r/m, and preferably at all three speeds, preferably as measured according to ASTM D1200-10(2014) or ASTM D2196 as appropriate.

Coating Composition Formation Methods

The copolymers as formed in accordance with the procedures described herein may then be used to form various coating compositions that have the substantial advantages described above. For example, various solvents can be used for the preparation of solution-type paints or coatings by adding those solvents to the fluorocopolymer of the present invention formed as described herein. In certain embodiments, preferred solvents for formation of the coating composition include aromatic hydrocarbons such as xylene and toluene; alcohols such as n-butanol; esters such as butyl acetate; ketones such as methyl isobutyl ketone, and glycol ethers such as ethyl cellusolve and various commercial thinners.

In certain embodiments, the coating composition of the present invention has a solid content of from about 70% to about 90% by weight based on the total weight of the coating composition, and more preferably in certain embodiments from about 75% go about 85% by weight of solids. In certain preferred embodiments, the solids comprise and preferably consist essentially of the copolymers of the present invention and/or crosslinked copolymers formed using the copolymers of the present invention.

EXAMPLES

The present invention is further illustrated by the following non-limiting examples.

Example 1

Fluoropolymer Preparation

A solution polymerization operation is carried out by charging into a 5500 ml stainless steel autoclave equipped with a stirrer the components as indicated in the following Table 1A:

TABLE 1A

| COMPONENT | | Weight, | | Monomer | Monomer, |
|---|---|---|---|---|---|
| TYPE | NAME | grams | Wt % | Moles | mol % |
| Solvent | butyl acetate | 1780 | 42.09 | | |
| First Monomer (fluoropolymer) | 1,3,3,3-tetrafluoro-propene (HFO-1234ze) | 1150 | 27.2 | 10.09 | 50.3 |
| Second Monomer (vinyl ester) | VEOVA-10 | 708 | 16.74 | 3.58 | 17.73 |
| Third Monomer (vinyl ester) | ethyl vinyl ether | 259 | 6.12 | 3.7 | 18.35 |
| Third Monomer (alkylhydroxy ether) | hydroxybutyl-vinly ether | 325 | 7.69 | 2.8 | 13.89 |
| Initiator | tertbutylperoxy-pivalate | 6.7 | 0.16 | | |

1780 g of butyl acetate as a carrier/solvent, 259 g of ethyl vinyl ether monomer, 708 g vinyl ester monomer (VEOVA-10), 325 g of hydroxybutyl vinyl ether, and 6.7 g of an initiator for the polymerization reaction, namely, tert-butyl peroxypivalate. The mixture was solidified with liquid nitrogen, and deaerated to remove the dissolved air. Then, 1150 g of 1,3,3,3-tetrafluoropropene (HFO-1234ze) was added to the mixture in the autoclave, and the mixture was then gradually heated to about 57° C. The mixture was then stirred for about 18 hours to carry-out solution copolymerization of the monomers. After the autoclave was cooled to room temperature, any unreacted monomers were purged and then the autoclave was opened and a vacuum was applied to the autoclave for a sufficient period of time to remove sufficient excess solvent to achieve a solid content (copolymer content) in the autoclave of about 70% by weight. The final fluorocopolymer (without solvent) was tested and found to have a number average molecular weight (Mn) of about 10951 and weight average molecular weight (Mw) of about 23263 and a Mw/Mn of 2.12, The resulting copolymer plus solvent combination was in the form of a clear solution having a solid, that is, copolymer, content of about 70% and a VOC content of about 400 g/l.

The solvent/polymer resulting from the operation described about was then added to each of the materials identified in Table 1B below on a 1:1 weight basis and was found to form a clear solution at room temperature:

TABLE 1B

| Solubility Test (1:1 wt ratio) | |
|---|---|
| Sovent | Appearance |
| Methanol | Clear solution |
| Ethanol | Clear solution |
| Petroleum Ether | Clear solution |
| n-Hexane | Clear solution |
| Xylene | Clear solution |
| Toluene | Clear solution |
| Methyl Ethyl Ketone | Clear solution |

TABLE 1B-continued

Solubility Test (1:1 wt ratio)

| Sovent | Appearance |
| --- | --- |
| Acetone | Clear solution |
| Propylene Glycol Monomethyl Ether Acetate (PMA) | Clear solution |
| Butyl Acetate | Clear solution |
| THE | Clear solution |

The result reported above indicates that the fluorocopolymer according to the present invention is capable of forming solutions with many materials that may be used in or form a substantial part of formulations for protective coatings, and accordingly the present fluorocopolymer has excellent usefulness in the formation of protective coatings in conjunction with a wide variety of materials that may be used, for example, as supplemental carriers in such coating compositions.

Example 2

Coating Composition and Coating Properties

A coating composition in the form of a white paste is formed by blending 60 parts by weight of the 30/70 solvent/fluorocopolymer combination removed from the autoclave of Example 1 with 40 parts by weight of titanium oxide. The mixture was mixed for 1 hour by a paint shaker.

A coating composition in the form of a white paint is formed by blending 40 parts by weight of the white paste as formed above and 60 parts by weight of the 30/70 solvent/fluorocopolymer combination removed from the autoclave of Example 1. The mixture was mixed for 1 hour by a paint shaker.

The solid content, VOC content and viscosity were measured and the results are as shown below in Table 2A.

TABLE 2A

Solid Content, VOC Content and Viscosity-White Paint

| | Fluorocopolymer Content in composition | Solid content of white paint coating | VOC content of coating | Viscosity, 25° C., MPa · s | | |
| --- | --- | --- | --- | --- | --- | --- |
| | | | | 12 r/m | 30 r/m | 60 r/m |
| COATING COMPOSITION | of Example 1 (wt %) | composition (wt %) | composition (g/l) | | | |
| Example 1-white paint | 70.0 | 76.6 | 340 | 1695 | 1678 | 1690 |

* r/m is revolutions per minute

As can be seen from the results reported above, a coating formulation was achieved having at once the following combination of highly desirable properties: (1) high copolymer (solids) content of 76 wt %; (2) a low VOC content of 340 g/l; and (3) a viscosity that is effective and efficient for many coating applications, such as for example spraying, brushing, rolling and dipping.

About 8 to about 10 parts by weight of a curing agent, such as Desmoudur N3390, is then combined with about 100 parts by weight of the white paint as described above in a high speed dispersion machine at 1500 RPM for 30 minutes to form a curable protective coating composition.

The curable protective coating composition is tested for color retention according to ASTM D 7251, QUV-A, and the results are as shown below in Table 2B below.

TABLE 2B

Color Retention Test

| Hours | Color change (ΔE) Fluoropolymer Example 1 |
| --- | --- |
| Initial | 0 |
| 456 | 0.5 |
| 624 | 0.8 |
| 792 | 1.1 |
| 1008 | 1.2 |
| 1128 | 1.0 |

The results have shown that after 1000 hour QUV test, the cured coating based on the fluorocopolymer from Example 1 and the coating composition of Example 2 has excellent color retention performance, showing only a color loss of about 1.2 or less.

Comparative Example 1

Comparative Coating Composition

A white paste and a white paint are formulated using the same procedure as Example 2 except that instead of the fluorocopolymer/solvent combination formed by Example 1, a fluorocopolymer of cholorotrifluoroethylene and vinyl ethers, commercially available under the trade designation ZHM-2 from Shanghai 3F New Materials Company LTD is used. ZHM-2 has a solid content of 60 weight %, and a white paint coating composition with a solids content of 66.7 weight % and a VOC content of 420 g/l, which is substantially higher than the white paint coating formulation of the present invention as exemplified in Example 2. The formulation had a viscosity 25° C. at 12 revolutions per minute (dm) and 30 dm of 3560 and 3525 mPa·s, respectively, which is substantially and undesirably higher than obtained with the composition of the present invention. When tested for viscosity at 60 r/m, the coating viscosity became elevated beyond the point of being able to be tested. The curable protective coating composition thus produced is tested for color retention according to ASTM D 7251, QUV-A, which is the same as Example above, and the results are as shown below in Table C1 below.

TABLE C1

Color Retention Test

| Hours | Color change (ΔE) ZHM-2 |
|---|---|
| Initial | 0 |
| 456 | 1.8 |
| 624 | 1.3 |
| 792 | 2.2 |
| 1008 | 2.9 |
| 1128 | 4.0 |

As can be seen from the above, the protective coating made using the ZHM-2 resulted in a color change that was substantially lower after every tested period, and was approximately 400% on a relative basis worse after 1128 hours than the coating formed according to the present invention.

Comparative Example 2

Comparative Coating Composition

A white paste and a white paint are formulated using the same procedure as Example 2 except that instead of the fluorocopolymer/solvent combination formed by Example 1, a fluorocopolymer of cholorotrifluoroethylene and vinyl ethers/esters, commercial available from Daikin, of Japanese company, as GK-570 is used. GK-570 has a solid content of 65 weight, and a white paint coating composition made therefrom has a solids content of 71.9 weight % and a VOC content of 380 g/l, which is substantially higher than the white paint coating formulation of the present invention as exemplified in Example 2. The formulation had a viscosity at 25° C. at 12 revolutions per minute (r/m), 30 r/m and 60 r/m respectively of 1960, 1950 and 1935 mPa·s, which is substantially and undesirably higher than obtained with the composition of the present invention. The curable protective coating composition thus produced is tested for color retention according to ASTM D 7251, QUV-A, and the results are as shown below in Table C3 below.

| Hours | Color change (ΔE) ZHM-2 |
|---|---|
| Initial | 0 |
| 456 | 4.3 |
| 624 | 4.0 |
| 792 | Not measurable |
| 1008 | Not measurable |
| 1128 | Not measurable |

Comparative Example 3

High VOC Coating Baseline Operations

An operation comprising providing a protective coating on a metal substrate is carried out by using 100 liters of the white paint coating composition of Comparative Example 2 to spray coat each of 100 metal parts for use in building construction, using 1 liter of said the coating composition per part to obtain the desired coverage on each part. The spraying operation is carried-out in an open air environment where solvent evaporated during the spray coating operation is released into the Earth's atmosphere. After all parts are spray coated, a base-line release of VOCs of about 42,000 grams of VOC is created.

Example 3

Reduced VOC Coating Operations

The operation conducted according to Comparative Example 3 is repeated except that the coating composition is replaced by the coating composition of the present invention according to Example 2. 100 liters of the white paint coating composition of Example 2 is used to spray coat each of 100 metal parts for use in building construction, using 1 liter of the coating composition per part to obtain the desired coverage on each part. The spraying operation is carried-out in an open air environment where solvent evaporated during the spray coating operation is released into the Earth's atmosphere. After all parts are spray coated, about 34,000 grams of VOCs are released into the atmosphere, constituting an 8,000 gram reduction in the amount of VOCs released as a result of the operation. Moreover, due to the lower viscosity of the coating composition compared to the coating composition of Comparative Example 3, the operation is completed in a substantially shorter period of time and/or at a lower cost, and the coating on the part is substantially superior at least in color retention to the coating of Comparative Example 3.

Example 4

Obtaining VOC Tax Credits or Other Legal Benefit for Reduced VOC Coating Operations The baseline operation conducted according to Comparative Example 3 is recorded and appropriately document according to the VOC tax or other laws or regulations that provide benefits for reduced VOC operations in the jurisdiction in which the operations are conducted. The reduced VOC operation of Example 3 is conducted or is intended to be conducted in place of the high VOC baseline operation, and request is made to the jurisdictional authority having responsibility for the credit or other the benefit to receive the credit or other benefit. Upon processing of the request, the credit or other benefit is received.

As used herein, the singular forms "a", "an" and "the" include plural unless the context clearly dictates otherwise. Moreover, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

It will be appreciated by those persons skilled in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

It is to be understood that both the foregoing general description and the following detailed description are exemplary and explanatory only and are not restrictive of the invention as claimed. Other embodiments will be apparent to those skilled in the art from consideration of the specification and practice of the invention disclosed herein.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A coating composition comprising:
    (i) one or more fluorocopolymers formed by copolymerization of monomers comprising:
        (1) from about 45 mol % to about 55 mol % of HFO-1234ze, (2A) from about 10 mol % to about 20 mol % of vinyl ester represented by the formula $CH_2=CR^1-O(C=O)_xR^2$, wherein x is 1, $R^1$ is hydrogen and $R^2$ is an unsubstituted branched-chain alkyl group having 6 to 8 carbon atoms, wherein said alkyl group includes at least one tertiary or one quaternary carbon atom,
        (2B) from about 10 mol % to about 20 mol % of vinyl ether represented by formula $CH_2=CR^3-OR^4$, wherein $R^3$ is hydrogen, $R^4$ is an unsubstituted straight-chain alkyl group having 1 to 3 carbon atoms, and
        (3) from about 3 mol % to about 30 mol % of hydroxyalkyl vinyl ether represented by the formula $CH_2=CR^3-O-R^5-OH$, where $R^3$ is hydrogen and $R^5$ is a C2 to C12 unsubstituted straight-chain, branched-chain or alicyclic alkyl group; and
    (ii) a carrier for said one or more fluorocopolymers, wherein said carrier comprises volatile organic compounds (VOCs),
    wherein said coating composition comprises: (a) at least about 70% by weight of said one or more fluorocopolymers; (b) not greater than about 30% by weight of said carrier; (c) a volatile organic compound content of less than about 400 g/l; and (d) a viscosity of less than about 1900 mPa·s as measured by Ford Cup of at least 12 revolutions per minute (r/m).

2. The coating composition of claim 1 wherein said one or more fluorocopolymers have a number average molecular weight of from about 10,000 to about 14,000.

3. The coating composition of claim 1 wherein $R^5$ is a C2 to C12 unsubstituted straight-chain alkyl group.

4. The coating composition of claim 1 wherein $R^5$ is a C3 to C5 unsubstituted straight-chain, branched-chain or alicyclic alkyl group.

5. The coating composition of claim 4 wherein $R^5$ is a C3 to C5 unsubstituted straight-chain alkyl group.

6. The coating composition of claim 1 wherein the carrier comprises butyl acetate.

7. The coating composition of claim 1 wherein the carrier comprises a C2-C5 alkyl acetate.

* * * * *